United States Patent

Suh et al.

[11] Patent Number: 6,100,371
[45] Date of Patent: Aug. 8, 2000

[54] POLYIMIDE FOR OPTICAL COMMUNICATIONS AND METHOD FOR PREPARING THE SAME

[75] Inventors: Dong-Hack Suh, Daejeon; Eun-Young Chung, Chungcheongnam-do; Tae-Hyung Rhee, Sungnam, all of Rep. of Korea

[73] Assignee: SamSung Electronics Co., Ltd., Suwon, Rep. of Korea

[21] Appl. No.: 09/157,102

[22] Filed: Sep. 18, 1998

[30] Foreign Application Priority Data

Sep. 18, 1997 [KR] Rep. of Korea ................... 97-47599

[51] Int. Cl.[7] ............................. C08G 73/10; C08G 69/26
[52] U.S. Cl. .................... 528/353; 528/125; 528/128; 528/172; 528/173; 528/174; 528/176; 528/183; 528/188; 528/220; 528/229; 528/350
[58] Field of Search .................................. 528/125, 128, 528/172, 173, 174, 176, 183, 188, 220, 229, 350, 353

[56] References Cited

U.S. PATENT DOCUMENTS 5,837,804  11/1998  Yarmagishi et al. ................... 528/353

FOREIGN PATENT DOCUMENTS

| 0 480266A2 | 4/1992 | European Pat. Off. . |
| 0 480266A3 | 4/1992 | European Pat. Off. . |
| 4-223406 | 8/1992 | Japan . |
| 5-1148 | 1/1993 | Japan . |
| 9-311232 | 12/1997 | Japan . |

OTHER PUBLICATIONS

WPI Accession No. 92–430319[52] & JP 4328504 (Nippon).
WPI Accession No. 92–430318[52] & JP 4328503 (Nippon).
WPI Accession No. 92–419571[51] & JP 4314733 (Nippon); and.
WPI Accession No. 92–419569[51] & JP 4314731 (Nippon).

*Primary Examiner*—P. Hampton-Hightower
*Attorney, Agent, or Firm*—Robert E. Bushnell, Esq.

[57] ABSTRACT

A polyimide for optical communications has a monomer, represented by the formula (1), as a repeating unit:

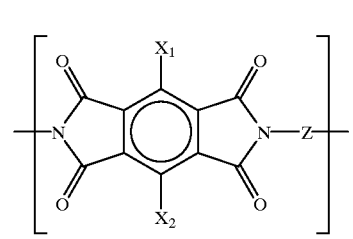

(1)

wherein $X_1$ and $X_2$ are independently selected from the group consisting of halogen atom, halogenated alkyl group, halogenated aromatic ring group, $-NO_2$, $-OR^1$ and $-SR^1$ (where $R^1$ is selected from the group consisting of halogenated alkyl and halogenated aromatic ring groups); and Z is selected from the group consisting of divalent halogenated aliphatic hydrocarbon, divalent halogenated aliphatic cyclic hydrocarbon and divalent halogenated aromatic hydrocarbon. Thus, light absorption loss at a near infrared light wavelength range can be minimized by using the polyimide, so that the polyimide is very useful as an optical material in the optical communications field using light of a near infrared light region.

15 Claims, No Drawings

POLYIMIDE FOR OPTICAL COMMUNICATIONS AND METHOD FOR PREPARING THE SAME

CLAIM OF PRIORITY

This application makes reference to, incorporates the same herein, and claims all benefits accruing under 35 U.S.C. §119 from an application for POLYIMIDE FOR OPTICAL COMMUNICATIONS AND METHOD FOR PREPARING THE SAME earlier filed in the Korean Industrial Property Office on the 18$^{th}$ of September 1997 and there duly assigned Ser. No. 47599/1997.

BACKGROUND OF THE INVENTION

1. Technical Field

The present invention relates to a polyimide for optical communications and a method for preparing the same. More particularly, the invention relates to a polyimide which is useful as a material for optical waveguiding in optical communications by minimizing light absorption loss in a near infrared light wavelength range, and to a polyimide which has good heat resistance and film processing properties.

2. Related Art

The range of light wavelength for optical communications has been shifted from 800 nm to 1,550 nm belonging to the near infrared light wavelength range. Thus, it is ideal to manufacture an optical communication device using a material which barely absorbs light belonging to the wavelengths of the near infrared light wavelength range.

In general, a polymer is used as an optical substrate such as an optical lens or compact disk. Recently, research into the use of a polymer as a material for an optical waveguide for light transfer in the near infrared light wavelength range has been conducted.

However, a general polymer absorbs light having a wavelength of 1,000~1,700 nm, which corresponds to the near infrared wavelength range. Such absorption of near infrared light by the polymer is caused by overtone of harmonics according to stretching and deformation vibrations of the carbon and hydrogen bond (C—H) in allyl, phenyl and other similar functional groups. Thus, using the polymer as a material for an optical waveguide utilizing light in the near infared wavelength range results in a large optical loss. In order to reduce the optical loss, the light absorption wavelength of the polymer should be shifted from the near infrared light wavelength region to a longer or shorter wavelength region. To this end, a method for replacing hydrogen of the carbon and hydrogen (C—H) bond with fluoride (F) or heavy hydrogen (D) has been suggested.

In particular, the method for replacing the hydrogen of the C—H bond with D is not suitable for a material for an optical communications device utilizing light of 1,500 nm because material having method which involves replacing the hydrogen with F can minimize optical loss in light absorption at a wavelength of 1,000~1,700 nm.

Also, an optical material for manufacturing an optical device, such as an opto-electronic integrated circuit (OEIC), an opto-electrical mixed wiring board (OEMWB), a hybrid integration device, a plastic optical fiber or a multi-chip module (MCM), requires thermal stability at 250° C. lasting at least for 30 minutes. Because such thermal resistance of the optical material is very important, glass transition temperature, thermal decomposition temperature, thermal expansion coefficient and birefrigency of the optical material should be carefully considered.

Polyimides are widely known as a materials having good thermal resistance. Because the polyimide has a resistance to heat at a high temperature, (e.g., approximately 400° C.), great efforts are being made to utilize polyimide as a material for optical communications.

However, in general, the ordinary polyimide has many C—H bonds within its molecule, and optical loss due to light absorption is large at the near infrared region. To solve this problem, a polyimide whose hydrogen of the C—H bond is partially or completely replaced with fluorine (F) has been reported.

However, when replacing the hydrogen of the C—H bond of the polyimide with F as described above, the refractive index of the polyimide decreases. The content of F in the polyimide is proportional to the decreased level of the refractivity index. Thus, because the polyimide whose hydrogen of the C—H bond is replaced with F (i.e., fluorinated polyimide), has a low reflective index, the range of selection of a material capable of being used for cladding becomes narrow when fluorinated polyimide is used as a material for the core of an optical fiber.

Also, the higher the fluorine content in the polyimide is, the lower the surface tension of the polymer is. Thus, it is difficult to coat a substrate with such a polymer, and a film formed from such polymer shows poor adhesion properties. As a result, film characteristics are deteriorated and the film is very fragile. Thus, in actual practice, it is difficult to use a polyimide as a material for optical waveguiding.

SUMMARY OF THE INVENTION

To solve the above problems, it is an objective of the present invention to provide a polyimide for optical communications which minimizes light absorption loss in a near infrared light wavelength range of 1,000~1,700 nm, and which has stable heat resistance and good film processing properties.

It is another objective of the present invention to provide a method for preparing such a polyimide.

To achieve the first objective, there is provided a polyimide for optical communications having a monomer, represented by the formula (1), as a repeating unit:

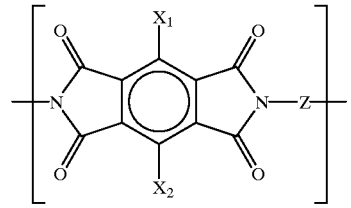

(1)

wherein $X_1$ and $X_2$ are independently selected from the group consisting of halogen atom, halogenated alkyl group, halogenated aromatic ring group, —$NO_2$, —$OR^1$ and —$SR^1$ (where $R^1$ is a halogenated alkyl or halogenated aromatic ring group); and Z is selected from the group consisting of divalent halogenated aliphatic hydrocarbon, divalent halogenated aliphatic cyclic hydrocarbon and divalent halogenated aromatic hydrocarbon.

Preferably, $X_1$ and $X_2$ are the same, and are selected from the group consisting of chlorine, partially chlorinated or perchlorinated alkyl group, partially chlorinated or perchlorinated aromatic ring group, partially chlorinated or perchlorinated alkoxy group, and partially chlorinated or perchlorinated phenoxy group.

The Z is selected from the group consisting of divalent halogenated aliphatic hydrocarbon of $C_1$–$C_{25}$, divalent halogenated aliphatic cyclic hydrocarbon of $C_5$–$C_{25}$ and divalent halogenated aromatic hydrocarbon of $C_6$–$C_{25}$. In particular, Z is preferably represented by the following structural formula:

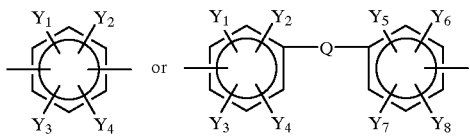

wherein $Y_1$, $Y_2$, $Y_3$, $Y_4$, $Y_5$, $Y_6$, $Y_7$ and $Y_8$ are independently selected from the group consisting of halogen atom, halogenated alkyl group, halogenated aromatic ring group, —$NO_2$, —$OR^1$ and —$SR^1$ (where $R^1$ is a halogenated allyl or halogenated aromatic ring group); and Q is a simple chemical bond or selected from the group consisting of —O—, —CO—$SO_2$—, —S—, —$(OT)_m$—, —$(TO)_m$— and —$(OTO)_m$— (where T is halogenated alkylene or halogenated arylene group and m is an integer from 1 to 10).

To achieve the second objective, there is provided a method for preparing a polyimide for optical communications having a monomer, expressed by the chemical formula (1), as a repeating unit, the method comprising the steps of:

(a) reacting 3,6-disubstituted benzenetetracarboxylic acid anhydride(A) with diaminecompound (B) at −20~50° C., and then precipitating the reaction mixture using distilled water or a non-polar organic solvent, to obtain polyamic acid as an intermediate; and (b) imidizing the polyamic acid:

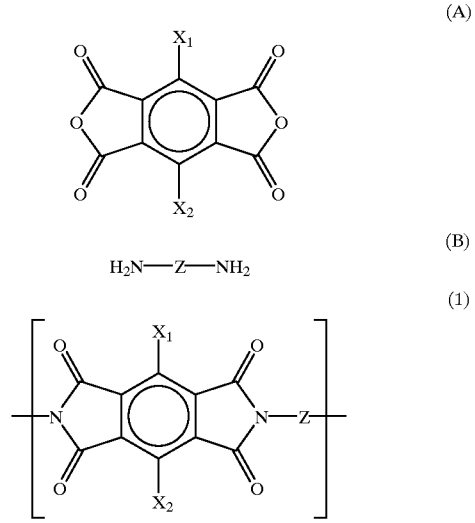

wherein $X_1$ and $X_2$ are independently selected from the group consisting of halogen atom, halogenated alkyl group, halogenated aromatic ring group, —$NO_2$ (where $R^1$ is a halogenated alkyl or halogenated aromatic ring group); and Z is selected from the group consisting of divalent halogenated aliphatic hydrocarbon, divalent halogenated aliphatic cyclic hydrocarbon and divalent halogenated aromatic hydrocarbon.

In step (a), the 3,6-disubstituted benzenetetracarboxylic acid anhydride (A) is preferably reacted with the diamine compound (B) at 5~20° C. for 100~230 hours. At such reaction conditions, the yield of step (a) is good.

In step (b), imidization of the polyamic acid into the polyimide can be performed by a chemical method or a thermal method. In the chemical method, the polyamic acid is mixed with acetic anhydride and pyridine, and is then heated at 60~150° C., or toluene is added to the polyamic acid and then heated to a boiling point of the toluene. In the thermal method, the polyamic acid is heated by steps in a temperature range of 50~400° C.

DESCRIPTION OF THE PREFERRED EMBODIMENTS

In a polyimide according to the present invention, the H of the C—H bond is replaced by a halogen atom or nitro group. The halogen atom replacing for H is not limited to a specific halogen atom, and combinations of various halogen atoms are possible.

Preferably, the polyimide has a molecular weight of $5\times10^3$~$4\times10^5$ Dalton, and a thermal decomposition temperature of 300~500° C., showing good heat resistance.

Hereinafter, a method for preparing the polyimide according to the present invention will be described.

A method for preparing 3,6-disubstituted-1,2,4,5-benzenetetracarboxylic acid anhydride (A) will be described with reference to the reaction scheme (1).

1,2,4,5-tetramethylbenzene (D) is mixed with iodine and petroleum ether, and a halogen compound, such as hydrogen bromide, hydrogen chloride and hydrogen fluoride, or nitric acid, are added to the mixture. The mixture is then reacted at 0~40° C. for 1~24 hours, resulting in 3,6-disubstituted-1,2,4,5-tetramethylbenzene (E).

The 3,6-diallyl-1,2,4,5-tetramethylbenzene (E) is oxidized by various oxidation methods using a transition metal catalyst, potassium permanganate or nitric acid, to obtain 3,6-disubstituted-1,2,4,5-benzenetetracarboxylic acid (F).

A method using potassium permanganate, among the various oxidation methods, will be described in detail.

3,6-disubstituted-1,2,4,5-tetramethylbenzene (E) is mixed with pyridine and water, and the mixture is heated to approximately 100° C. Potassium permanganate is added to the reaction mixture and reacted at 40° C. for 2~24 hours, and the obtained reaction mixture is acidified using a 5N-HCl solution. Then, the solvent is removed from the reaction mixture, resulting in 3,6-disubstituted-1,2,4,5-benzenetetracarboxylic acid (F).

Acetic acid and acetic anhydride are added to the 3,6-dialkyl-1,2,4,5-benzenetetracarboxylic acid (F), and the mixture is reacted at 40~100° C. for 0.5~24 hours, resulting in 3,6-disubstituted-1,2,3,4,5-benzenetetracarboxylic acid anhydride (A).

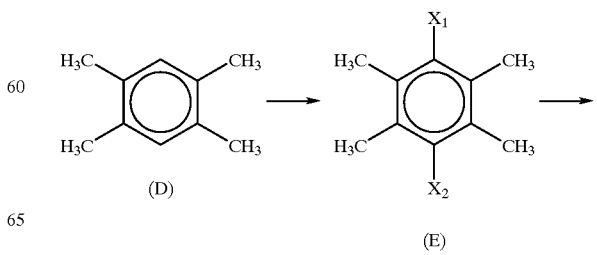

-continued

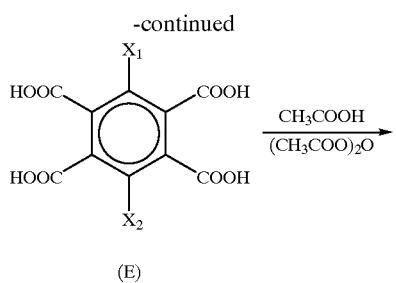

(E)

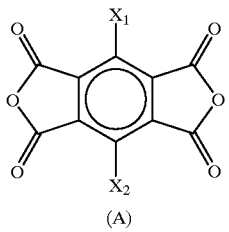

(A)

In the reaction scheme (1), $X_1$ and $X_2$ are independently selected from the group consisting of a halogen atom, halogenated alkyl group, halogenated aromatic ring group, $-NO_2$, $-OR^1$ and $-SR^1$ (where $R^1$ is a halogenated alkyl or halogenated aromatic ring groups).

A polyimide (C) is prepared according to the reaction scheme (2). That is, 3,6-disubstituted-1,2,4,5-benzenetetracarboxylic acid anhydride (A) and a diamine compound (B) are dissolved in a solvent such as N,N-dimethyl acetamide, and reacted at $-20\sim50°$ C. for 300 hours. The reaction mixture is mixed with distilled water or an organic solvent such as methanol, to form a precipitate, that is polyamic acid. Here, the polyamic acid has a molecular weight of $6\times10^3\sim5\times10^5$ dalton.

The polyamic acid is imidized to prepare the polyimide (C).

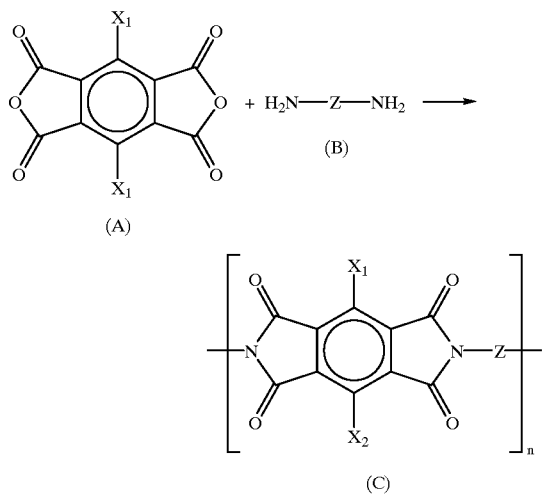

In the reaction scheme (2), $X_1$ and $X_2$ are the same as defined in the description of the reaction scheme (1), and Z is selected from the group consisting of divalent halogenated aliphatic hydrocarbon, divalent halogenated aliphatic cyclic hydrocarbon and divalent halogenated aromatic hydrocarbon.

Imidization of the polyamic acid into the polyimide can be performed by a chemical method or a thermal method. In the chemical method, acetic anhydride and pyridine are added to a mixture containing 3,6-disubstituted-1,2,4,5-benzenetetracarboxylic acid anhydride (A) and a diamine compound (B), and heated at $60\sim150°$ C. Otherwise, toluene is added to the mixture containing the 3,6-disubstituted-1, 2,4,5-benzenetetracarboxylic acid anhydride (A) and the diamine compound (B), and the resultant composition is heated to the boiling point of toluene. In the thermal method, the polyamic acid is heated by steps within a temperature range of $50\sim400°$ C.

It can be understood that imidization of polyamic acid into polyimide is measured by a thermogravimetry analysis (TGA) method at $200\sim250°$ C.

The polyimide according to the present invention, obtained by the above method, has a molecular weight of $5\times10^3\sim4\times10^5$ Dalton.

The diamine compound (B) is not limited to a specific compound. For example, the diamine compound (B) may be bis(perfluorophenyl)alkanes, bis(perfluorophenyl)sulfones, bis(perfluorophenyl)ethers or $\alpha,\alpha'$-bis(perfluorophenyl) dfisopropylbenzenes. In detail, the diamine compound (B) includes tetrafluoro-1,2-phenylenediamine, tetrafluoro-1,3-phenylendiamine, tetrafluoro-1,4-phenylenediamine, tetrachloro-1,2-phenylenediamine, tetrachloro-1,3-phenylenediamine, tetrachloro-1,4-phenylenediamine, hexafluoro-1,5-diaminonaphthalene, hexafluoro-2,6-diaminonaphthalene, 3-trifluoromethyltrifluoro-1,2-phenylenediamine, 4-trifluoromethyltrifluoro-1,2-phenylenediamine, 2-trifluoromethylfluoro-1,3-phenylenediamine, 4-trifiuoromethyltrifluoro-1,3-phenylenediamine, 5-trifluoromethyltrifiuoro-1,3-phenylenediamine, 2-trifluoromethyltrifluoro-1,4-phenylenediamine, 3-pentafluoroethyltrifluoro-1,2-phenylenediamine, 4-pentafluoroethyltrifluoro-1,2-phenylenediamine, 2-pentaluoroethyltrifiuoro-1,3-phenylenediamine, 4-pentafluoroethyltrifluoro-1,3-phenylenediamine, 5-pentafluoroethyltrifluoro-1,3-phenylenediamine, 2-pentafluoroethyltrifluoro-1,4-phenylenediamine, 3,4-bis(trifluoromethyl)difluoro-1,2-phenylenediamine, 3,5-bis(trifluoromethyl)difluoro-1,2-phenylenediamine, 2,4-bis(trifluoromethyl)difluoro-1,3-phenylenediamine, 4,5-bis(trifluoromethyl)difluoro-1,3-phenylenediamine, 2,3-bis(trifluoromethyl)difluoro-1,4-phenylenediamine, 2,5-bis(trifluoromethyl)difluoro-1,4-phenylenediamine, 3,4-bis(trifluoromethyl)difluoro-1,2-phenylenediamine, 3-trifluoromethoxytrifuoro-1,2-phenylenediamine, 4-trifluoromethoxytrifiuoro-1,2-phenylenediamine, 2-trifluoromethoxytrifluoro-1,3-phenylenediamine, 4-trifluorometlioxytrifluoro-1,3-phenylenediamine, 5-triuoromethoxytrifluoro-1,3-phenylenediamine, 2-trifluoromethoxytrifluoro-1,4-phenylenediamine, 3,4,5-tris(trifluoromethyl)fluoro-1,2-phenylenediamine, 3,4,6-tris(trifluoromethyl)fluoro-1,2-phenylenediamine, 2,4,5-tris(trifluoromethyl)fluoro-1,3-phenylenediamine, 2,4,6-tris(trifluoromethyl)fluoro-1,3-phenylenediamine, 4,5,6-tris(trifluoromethyl)fluoro-1,3-phenylenediamine, tetrakis(trifluoromethyl)-1,2-phenylenediamine,tetrakis(trifluoromethyl)-1,3-phenylenediamine,tetrakis(trifluoromethyl)-1,4-phenylenediamine, 3,3'-dianiinooctafluorobiphenyl, 3,4'-diarinooctafluorobiphenyl, 4,4'-diaminooctafluorobiphenyl, 3,3'-diaminooctachlorobiphenyl, 3,4'-diaminooctachlorobiphenyl, 4,4'-diaminooctachlorobiphenyl, 2,2'-bis(trichloromethyl)-4,4'-diaminohexachlorobiphenyl, 3,3'-bis(trichloromethyl)-4,4'-diaminohexafluorobiphenyl, bis(4-aminotetralluorophenyl) dichloromethane, 1,2-bis(4-aminotetrafluorophenyl)

tetrachloroethane, 2,2-bis(4-aminotetrafluorophenyl) hexachloropropane, 2,2'-bis(trifluoromethyl)-4,4'-diaminohexachlorobiphenyl, 3,3'-bis(trifluoromethyl)4,4'-diaminohexafluorobiphenyl, bis(4-aminotetrafluorophenyl) difluoromethane, 1,2-bis(4-aminotetrafluorophenyl) tetrachloroethane, 2,2-bis(4-aminotetrafluorophenyl) hexafluoropropane, bis(3-aminotetrafluorophenyl)ether, 3,4'-diaminooctafluorobiphenylether, bis(4-aminotetrafluorophenyl)ether, bis(3-aminotetrachlorophenyl)ether, 3,4'-diaminooctachlorobiphenylether, bis(4-aminotetrachlorophenyl)ether, 3,3'-diaminooctafluorobenzophenone, 3,4'-diaminooctafluorobenzophenone, 4,4'-diaminooctafluorobenzophenone, bis(3-aminotetrafluorophenyl)sulfone, 3,4'-diaminooctafluorobiphenylsulfone, bis(4-aminotetrafluorophenylsulfone), bis(3-aminotetrafluorophenyl)sulfide, 3,4'-diaminooctafluorobiphenylsulfide, bis(4-aminotetrafluorophenyl)sulfide, 4-aminotetrafluorophenoxy-4'-aminotetrafluorophenyldifluoromethane, bis(4-aminotetrafluorophenoxy)difluoromethane, 1,2-bis(4-aminotetrafluorophenoxy)tetrafluoroethane, 2,2-bis(4-aminotetrafluorophenoxy)hexafluoropropane,bis(4-aminotetrafluorophenoxy)dicbloromethane, 1,2-bis(4-aminotetrafluorophenoxy)tetrachloroethane, 2,2-bis(4-aminotetraflurophenoxy)hexachloropropane, 4,4"-diaminododecafluoro-p-terphenyl, 2',3'-bis(trifluoromethyl)-4,4"-diamino-p-terphenyl,2,2"-bis(trifluoromethyl)-4,4"-diamino-p-terphenyl, 2',5'-bis(trifluoromethyl)-4,4"-diaminoterphenyl, 2,7-diaminohexafluorodibenzofuran, 1,4-bis(4-aminotetrafluorophenoxy)tetrafluorobenzene, 2,6-diaminohexafluoronaphthalene, 2,7-diaminooctafluorophenanthrene, 2,6-diaminooctafluoroanthracene, 2,7-diaminohexafluorothianthrene, 2,6-diaminohexafluoroanthraquinone, 2,6-diaminohexafluorobiphenylene, 2,6-diaminooxtafluoroanthrone, 2,7-diaminotetrafluorodibenz[b,e]1,4-dioxane, 2,2'-bis(4-aminophenyl)hexafluoropropane, 2,2'-bis(4-aminophenyl)hexachloropropane, 2,4-diaminobenzotrifluoride, 2,2-bis(trifluoromethyl)benzidine, 2,2-bis[4-(4amino-2-triuorophenoxy)phenyl]hexafluoropropane, 2,2-bis[4-(4-amino-2-trifluorophenoxy)phenyl]hexachloropropane, 3,4-diaminobenzotrifluoride, 3,5-diaminobenzotrifluoride, 2,5-diaminobenzotrifluoride, 2,2-bis[4-(4-aminophenoxy) phenyl]hexafluoropropane, 2,2-bis[4-(4-amino phenoxy) phenyl]hexachloropropane, or 3,4-diamino-1-fluorobenzene.

Hereinafter, the present invention will be described in detail through the following examples. However, the present invention is not limited to the following examples.

EXAMPLE 1

0.001 mol of 3,6-dichloro-1,2,4,5-benzenetetracarboxylic acid anhydride, 0.001 mol of tetrafluoro-1,3-phenylenediamine and 3 ml of N,N-dimethylacetamide were mixed under a nitrogen atmosphere, and were stirred at room temperature for 9 days.

The reaction mixture was added to distilled water to form a precipitate. The obtained precipitate was filtered and washed with distilled water several times. Then, the resultant composition was dried in a vacuum oven set to 60° C. for 24 hours, resulting in a pale yellow product. The product was heated in a vacuum oven set to 250° C., resulting in polyimide PI (1) (yield: 85%).

EXAMPLE 2

Polyimide PI (2) was obtained by the same method as in Example 1, except that 0.001 mol of 3,6-dichloro-1,2,4,5-benzenetetracarboxylic acid anhydride, 0.001 mol of 4,4'-diaminooctafluorobiphenyl and 4 ml of N,N-dimethylacetamide were mixed under a nitrogen atmosphere and were stirred at room temperature for 7 days (yield: 80%).

EXAMPLE 3

0.001 mol of 3,6-dichloro-1,2,4,5-benzenetetracarboxylic acid anhydride, 0.001 mol of hexafluoro-1,5-diaminonaphthalene and 4 ml of N,N-dimethylacetamide were mixed under a nitrogen atmosphere and were stirred at room temperature for 9 days.

The reaction mixture was added to distilled water to form a precipitate. The obtained precipitate was filtered and washed with distilled water several times. Then, the resultant composition was dried in a vacuum oven set to 60° C. for 24 hours, resulting in a pale yellow product. Acetic anhydride and pyridine were added to the product, and the product was heated.

The reaction mixture was mixed with distilled water to form a precipitate, and the precipitate was filtered. The resultant was washed with distilled water several times, and was dried in a vacuum oven set to 60° C. for 24 hours, resulting in polyimide PI (3) (yield: 78%)

EXAMPLE 4

Polyimide PI (4) was obtained by the same method as in Example 3, except that 0.001 mol of 3,6-dichloro-1,2,4,5-benzenetetracarboxylic acid anhydride, 0.001 mol of tetrachloro-1,3-phenylenediamine and 5 ml of N,N-dimethylacetamide were mixed under a nitrogen atmosphere and were stirred at room temperature for 9 days (yield: 90%).

EXAMPLE 5

Polyimide PI (5) was obtained by the same method as in Example 3, except that 0.001 mol of 3,6-dichloro-1,2,4,5-benzenetetracarboxylic acid anhydride, 0.001 mol of 4,4'-diaminooctachlorobiphenyl and 3 ml of N,N-dimethylacetamide were mixed under a nitrogen atmosphere and were stirred at room temperature for 9 days (yield: 83%).

EXAMPLE 6

Polyimide PI (6) was obtained by the same method as in Example 1, except that 0.001 mol of 3,6-dichloro-1,2,4,5-benzenetetracarboxylic acid anhydride, 0.001 mol of 2,3-bis(trifluoromethyl)difluoro-1,4-phenylenediamine and 4 ml of N,N-dimethylacetamide were mixed under a nitrogen atmosphere and were stirred at room temperature for 9 days (yield: 61%).

EXAMPLE 7

Polyimide PI (7) was obtained by the same method as in Example 3, except that 0.001 mol of 3,6-dichloro-1,2,4,5-benzenetetracarboxylic acid anhydride, 0.001 mol of bis(4-aminotetrafluorophenyl)difluoromethane and 5 ml of N,N- dimethylacetamide were mixed under a nitrogen atmosphere and were stirred at room temperature for 9 days (yield: 82%).

EXAMPLE 8

Polyimide PI (8) was obtained by the same method as in Example 1, except that 0.001 mol of 3,6-dichloro-1,2,4,5-benzenetetracarboxylic acid anhydride, 0.001 mol of 2-trifluoromethyltrifluoro-1,3-phenylenediamine and 3 ml of N,N-dimethylacetamide were mixed under a nitrogen atmosphere and were stirred at room temperature for 9 days (yield: 71%).

EXAMPLE 9

Polyimide PI (9) was obtained by the same method as in Example 1, except that 0.001 mol of 3,6-dichloro-1,2,4,5-benzenetetracarboxylic acid anhydride, 0.001 mol of 2,2-bis(4-aminotetrafluorophenyl)hexafluoropropane and 4 ml of N,N-dimethylacetamide were mixed under a nitrogen atmosphere and were stirred at room temperature for 9 days (yield: 70%).

EXAMPLE 10

Polyimide PI (10) was obtained by the same method as in Example 1, except that 0.001 mol of 3,6-dichloro-1,2,4,5-benzenetetracarboxylic acid anhydride, 0.001 mol of bis(3-aminotetrafluorophenyl)ether and 3 ml of N,N-dimethylacetamide were mixed under a nitrogen atmosphere and were stirred at room temperature for 9 days (yield: 68%).

EXAMPLE 11

Polyimide PI (11) was obtained by the same method as in Example 1, except that 0.001 mol of 3,6-dichloro-1,2,4,5-benzenetetracarboxylic acid anhydride, 0.001 mol of 4,4'-diaminooctafluorobenzophenone and 5 ml of N,N-dimethylacetamide were mixed under a nitrogen atmosphere and were stirred at room temperature for 9 days (yield: 65%).

EXAMPLE 12

Polyimide PI (12) was obtained by the same method as in Example 1, except that 0.001 mol of 3,6-dichloro-1,2,4,5-benzenetetracarboxylic acid anhydride, 0.001 mol of 3,4'-diaminooctafluorobiphenylsulfone and 5 ml of N,N-dimethylacetamide were mixed under a nitrogen atmosphere and were stirred at room temperature for 9 days (yield: 62%).

EXAMPLE 13

Polyimide PI (13) was obtained by the same method as in Example 3, except that 0.001 mol of 3,6-dichloro-1,2,4,5-benzenetetracarboxylic acid anhydride, 0.001 mol of 2,2-bis(4-aminophenyl)tetrafluoropropane and 5 ml of N,N-dimethylacetamide were mixed under a nitrogen atmosphere and were stirred at room temperature for 9 days (yield: 75%).

EXAMPLE 14

Polyimide PI (14) was obtained by the same method as in Example 3, except that 0.001 mol of 3,6-dichloro-1,2,4,5-benzenetetracarboxylic acid anhydride, 0.001 mol of 2,4-bis(trifluoromethyl)benzidine and 5 ml of N,N-dimethylacetamide were mixed under a nitrogen atmosphere and were stirred at room temperature for 9 days (yield: 68%).

EXAMPLE 15

Polyimide PI (15) was obtained by the same method as in Example 3, except that 0.001 mol of 3,6-dichloro-1,2,4,5-benzenetetracarboxylic acid anhydride, 0.001 mol of 2,2-bis(4-aminotetrafluorophenyl)hexachloropropane and 5 ml of N,N-dimethylacetamide were mixed under a nitrogen atmosphere and were stirred at room temperature for 9 days (yield: 78%).

EXAMPLE 16

Preparation of an Optical Waveguide Device

First, polyimide Pl(1) prepared by the Example 1 was coated on a silicon wafer to form a lower buffer layer. Also, polyimide prepared by reacting 1,2,4,5-benzenetetracarboxylic acid anhydride with 1,3-phenylenediamine was coated on the lower layer to form a core layer.

Subsequently, a masking pattern was formed on the core layer through photolithography. The predetermined portion of the core layer was etched using the masldng pattern to form an optical waveguide, and then the masking pattern was eliminated. Then, polyimide Pl(1) prepared by the Example 1 was coated on the resultant to form an upper buffer layer, thus completing the optical waveguide device.

In the optical waveguide device manufactured by the Example 16, light absorption loss at a near infrared light waveguide range of 1,000~1,700 nm was measured.

As a result, the light absorption loss of the optical waveguide using the polyimide Pl(1) is less than that of the conventional perfluorinated polyimide.

The thermal stability, the light absorption loss at a near infrared light wavelength range of 1,000~1,700 nm, and the film processing property of the polyimide PI(1) through PI(15) synthesized by Examples 1 through 15 were measured.

The thermal stability of the polyimide was measured using a thermogravimetry analysis (TGA) method. As a result, it was seen that the heat resistance is good in that thermal decomposition occurred at 350~450° C.

It was also observed that the light absorption loss of the polyimide is similar to, or less than, is that of a conventional perfluorinated polyimide.

While the conventional partially fluorinated or perfluorinated polyimide has difficulty in its application due to its poor film processing property, the polyimides obtained by Examples 1 through 15 have an improved film processing property compared to that of the conventional polyimide.

The polyimide according to the present invention has a higher refractive index than the conventional fluorinated polyimide. Thus, when using such polyimide as a material for the core of an optical fiber, the selection range on the material for cladding becomes wide. Also, the coating property and adhesion to a substrate are improved compared to those of the conventional polyimide, thereby providing a good film forming property and good heat resistance.

Also, because the polyimide according to the present invention can minimize light absorption loss at a near infrared light wavelength range, the polyimide of the present invention is very useful as an optical material in the optical communications field when adopting light of near infrared light wavelength. That is, the polyimide according to the present invention can be used as a functional polymeric material having a low light absorption loss characteristic which is essential for manufacturing an optical device for optical waveguiding, such as an optoelectronic integrated circuit (OEIC), an opto-electrical mixed wiring board (OEMWB), a hybrid integration device, a multi-chip module (MCM) or a plastic optical fiber.

What is claimed is:

1. A polyimide for optical communications, comprising a repeating unit represented by the formula:

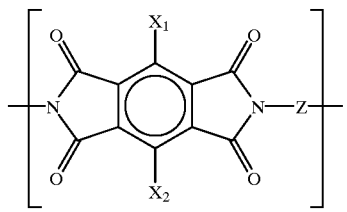

where $X_1$ and $X_2$ are each selected from the group consisting of chlorine, bromine, iodine, chlorinated alkyl group, brominated alkyl group, iodinated alkyl group, chlorinated aromatic ring group, brominated aromatic ring group, iodinated aromatic ring group, —$NO_2$, chlorinated alkoxy group, brominated alkoxy group, iodinated alkoxy group, chlorinated aryloxy group, brominated aryloxy group, iodinated aryloxy group and —SR, where R is selected from the group consisting of halogenated alkyl and halogenated aromatic ring group; and where Z is selected from the group consisting of divalent halogenated aliphatic hydrocarbon, divalent halogenated aliphatic cyclic hydrocarbon and divalent halogenated aromatic hydrocarbon.

2. A polyimide for optical communications, comprising a repeating unit represented by the formula:

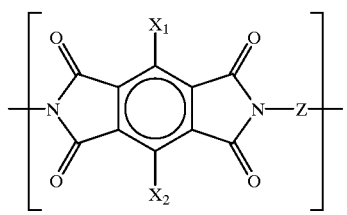

where $X_1$ and $X_2$ are each selected from the group consisting of halogen atom, halogenated alkyl group, halogenated aromatic ring group, —$NO_2$, —OR and —SR, where R is selected from the group consisting of halogenated alkyl and halogenated aromatic ring groups; and where Z is selected from the group consisting of divalent halogenated aliphatic hydrocarbon, divalent halogenated aliphatic cyclic hydrocarbon, divalent chlorinated aromatic hydrocarbon, divalent brominated aromatic hydrocarbon, and divalent iodinated aromatic hydrocarbon.

3. The polyimide of claim 1, where $X_1$ and $X_2$ are the same and are selected from the group consisting of chlorine, partially chlorinated or perchlorinated alkyl group, partially chlorinated or perchlorinated aromatic ring group, partially chlorinated or perchlorinated alkoxy group, and partially chlorinated or perchlorinated phenoxy group.

4. The polyimide of claim 1, where Z is selected from the group consisting of divalent halogenated aliphatic hydrocarbon of $C_1$–$C_{25}$, divalent halogenated aliphatic cyclic hydrocarbon of $C_5$–$C_{25}$ and divalent halogenated aromatic hydrocarbon of $C_6$–$C_{25}$.

5. The polyimide of claim 1, where Z is represented by the following structural formula:

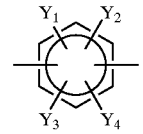

where $Y_1$, $Y_2$, $Y_3$, and $Y_4$, are independently selected from the group consisting of halogen atom, halogenated alkyl group, halogenated aromatic ring group, —$NO_2$, —$OR^1$ and —$SR^1$ (where $R^1$ is selected from the group consisting of halogenated alkyl and halogenated aromatic ring group).

6. The polyimide of claim 1, where Z is represented by the following structural formula:

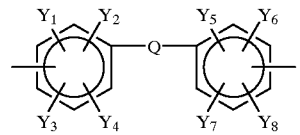

where $Y_1$, $Y_2$, $Y_3$, $Y_4$, $Y_5$, $Y_6$, $Y_7$ and $Y_8$ are independently selected from the group consisting of halogen atom, halogenated alkyl group, halogenated aromatic ring group, —$NO_2$, —$OR^1$ and —$SR^1$ (where $R^1$ is halogenated alkyl or halogenated aromatic ring groups); and Q is a simple chemical bond or selected from the group consisting of —O—, —CO—, —$SO_2$—, —S—, —$(OT)_m$—, —$(TO)_m$— and —$(OTO)_m$— (where T is selected from the group consisting of halogenated alkylene and halogenated arylene groups, and where m is an integer from 1 to 10).

7. The polyimide of claim 1, said polyimide having a molecular weight in the range of approximately $5 \times 10^3$ to $4 \times 10^5$ Dalton.

8. The polyimide of claim 1, said polyimide having a thermal decomposition temperature in the range of approximately 300 to 500° C.

9. A method for preparing a polyimide for optical communications, comprising the steps of:

(a) reacting a 3,6-disubstitutedbenzenetetracarboxylic acid anhydride of formula:

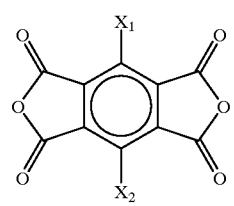

with a diamine compound of formula $H_2N$-Z-$NH_2$, where $X_1$ and $X_2$ are each selected from the group consisting of halogen atom, halogenated alkyl group, halogenated aromatic ring group, —$NO_2$, —$OR^1$ and —$SR^1$ (where $R^1$ is selected from the group consisting of halogenated alkyl and halogenated aromatic ring groups); and Z is selected from the group consisting of divalent halogenated aliphatic hydrocarbon, divalent halogenated aliphatic cyclic hydrocarbon and divalent halogenated aromatic hydrocarbon; at a temperature in the range of approximately −20 to 50° C.;

(b) precipitating the reaction mixture using one of distilled water and a non-polar organic solvent, to obtain a polyamic acid as an intermediate; and (c) imidizing the polyamic acid.

10. The method of claim 9, where, in step (a), the 3,6-disubstutitutedbenzenetetracarboxylic acid anhydride is reacted with the diamine compound at a temperature in the range of approximately 5 to 20° C. for a time in the range of approximately 100 to 230 hours.

11. The method of claim 9, where in step (c), the polyamic acid is mixed with acetic anhydride and pyridine and is then heated at a temperature in the range of approximately 60 to 150° C.

12. The method of claim 9, where in step (c) toluene is added to the polyamic acid and the mixture is then heated to the boiling point of the toluene.

13. The method of claim 9, where in step (c), the polyamic acid is heated by steps at a temperature in the range of approximately 50 to 400° C.

14. The method of claim 9, further comprising the step of, prior to step (a), forming the 3, 6-disubstituted benzenetetracarboxylic acid anhydride by:

mixing 1, 2, 4, 5-tetramethylbenzene with iodine and petroleum ether to obtain a mixture;

adding one of a halogen compound and nitric acid to the mixture, reacting the mixture at a temperature in the range of approximately 0 to 40° C. for a time in the range of approximately 1 to 24 hours to obtain a 3, 6-disubstituted-1, 2, 4, 5-tetramethylbenzene;

oxidizing the 3, 6-disubstituted-1, 2, 4, 5-tetramethylbenzene using one of a transition metal catalyst, potassium permanganate and nitric acid to obtain a 3, 6-disubstituted-1, 2, 4, 5-benzenetetracarboxylic acid;

adding acetic acid and acetic anhydride to the 3, 6-disubstituted-1, 2, 4, 5-benzenetetracarboxylic acid to obtain a resultant mixture; and reacting the resultant mixture at a temperature in the range of approximately 40 to 100° C. for a time in the range of approximately 0.5 to 24 hours to obtain the 3, 6-disubstitutedbenzenetetracarboxylic acid anhydride.

15. The method of claim 14, where said oxidizing step further comprises:

mixing the 3,6-disubstituted-1,2,4,5-tetramethylbenzene with pyridine and water to obtain a further mixture, heating the further mixture at approximately 100° C. to obtain a reaction mixture, adding potassium permanganate to the reaction mixture to obtain a still further mixture, reacting the still further mixture at approximately 40° C. for a time in the range of approximately 2 to 24 hours to obtain a yet further reaction mixture, acidifying the yet further reaction mixture using a 5N-HCl solution, and removing solvent from the acidified yet further reaction mixture to obtain the 3,6-disubstituted-1,2,4,5-benzenetetracarboxylic acid.

* * * * *